US008116279B2

(12) United States Patent
Kim et al.

(10) Patent No.: US 8,116,279 B2
(45) Date of Patent: Feb. 14, 2012

(54) MOBILE COMMUNICATION TERMINAL SUPPORTING MULTI-MODAL COMMUNICATIONS AND METHOD FOR PROVIDING SEAMLESS SERVICE UPON HANDOVER TO THE MOBILE COMMUNICATION TERMINAL

(75) Inventors: Chee Ha Kim, Yongin-si (KR); Hee-Jin Jang, Yongin-si (KR); Boung Jun Lee, Seongnam-si (KR); Jong Ho Bang, Suwon-si (KR); Su Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 595 days.

(21) Appl. No.: 11/797,269

(22) Filed: May 2, 2007

(65) Prior Publication Data
US 2008/0080426 A1   Apr. 3, 2008

(30) Foreign Application Priority Data
Sep. 29, 2006 (KR) ........................ 10-2006-0096313

(51) Int. Cl.
*H04W 4/00* (2009.01)

(52) U.S. Cl. ........ 370/331; 370/332; 370/333; 370/352; 370/401; 455/436; 455/437; 455/438; 455/439; 455/440; 455/441; 455/442; 455/443; 455/444; 709/230; 709/231; 709/238; 709/249; 709/250

(58) Field of Classification Search ................. 445/442; 455/436–444; 370/331, 332, 333, 352, 401; 709/230, 231, 232, 238, 249, 250
See application file for complete search history.

(56) References Cited

U.S. PATENT DOCUMENTS 5,659,598 A * 8/1997 Byrne et al. .................. 455/436
6,721,297 B2 * 4/2004 Korus et al. .................. 370/338
(Continued)

FOREIGN PATENT DOCUMENTS

KR   10-2005-0060626   6/2005
(Continued)

OTHER PUBLICATIONS

Racha Ben Ali et al, "An Efficient Predictive Admission Control Policy for Heterogeneous Wireless Bandwidth Allocation in Next Generation Mobile Networks," In Proc. of the 2006 International Conference on Wireless Communications and Mobile Computing, SESSION: T3-A: next generation mobile networks symposium, 2006, pp. 635-640, ACM, New York, NY, USA.
Hyun-Ho Choi et al, "Takeover: A New Vertical Handover Concept for Next-Generation Heterogeneous Networks," 2005 IEEE 61$^{st}$ Vehicular Technology Conference (VTC), May 2005, pp. 2225-2229, vol. 4, IEEE.

*Primary Examiner* — Olumide T Ajibade Akonai
(74) *Attorney, Agent, or Firm* — NSIP Law (57) ABSTRACT

A method of providing a handover service to a mobile communication terminal supporting multi-modal communications, and a mobile communication terminal for performing the method are provided. More particularly, a method of eliminating an interruption of a data transmission service occurring during a handover between different communication networks, and a terminal for performing the method are provided. A method of providing a handover service of a mobile communication terminal supporting multi-modal communications can include: transmitting and receiving data to/from a corresponding node via a first access network and a second access network while simultaneously maintaining an association with the first access network and the second access network, determining a point in time of completing a handover registration, and releasing an association with the first access network after the point in time of completing the handover registration.

5 Claims, 8 Drawing Sheets

U.S. PATENT DOCUMENTS

| | | | |
|---|---|---|---|
| 7,002,936 B2 * | 2/2006 | Agrawal et al. | 370/329 |
| 7,295,842 B2 * | 11/2007 | Yang et al. | 455/436 |
| 7,353,027 B2 * | 4/2008 | Karagiannis et al. | 455/436 |
| 2004/0127208 A1 * | 7/2004 | Nair et al. | 455/420 |
| 2005/0053034 A1 | 3/2005 | Chiueh | |
| 2005/0144303 A1 * | 6/2005 | Zhang et al. | 709/231 |
| 2005/0227691 A1 * | 10/2005 | Pecen et al. | 455/435.2 |
| 2006/0023683 A1 * | 2/2006 | Lee et al. | 370/338 |
| 2006/0166699 A1 | 7/2006 | Aghvami et al. | |
| 2006/0176853 A1 * | 8/2006 | Liu et al. | 370/331 |
| 2007/0032236 A1 * | 2/2007 | Kim et al. | 455/436 |
| 2007/0142051 A1 * | 6/2007 | Xu et al. | 455/436 |
| 2007/0160007 A1 * | 7/2007 | Wang et al. | 370/331 |

FOREIGN PATENT DOCUMENTS

| | | |
|---|---|---|
| KR | 10-2006-0032091 | 4/2006 |
| KR | 10-2006-0063620 | 6/2006 |
| KR | 10-2006-0080852 | 7/2006 |

* cited by examiner

MOBILE COMMUNICATION TERMINAL SUPPORTING MULTI-MODAL COMMUNICATIONS AND METHOD FOR PROVIDING SEAMLESS SERVICE UPON HANDOVER TO THE MOBILE COMMUNICATION TERMINAL

CROSS-REFERENCE TO RELATED APPLICATION

This application claims the benefit under 35 U.S.C. §119 (a) of a Korean Patent Application No. 10-2006-0096313, filed on Sep. 29, 2006, in the Korean Intellectual Property Office, the entire disclosure of which is hereby incorporated by reference.

BACKGROUND OF THE INVENTION

1. Field of the Invention

The present invention relates to a method of providing a handover service to a mobile communication terminal that is capable of multi-modal communication, and a mobile communication terminal for performing the method. More particularly, the present invention relates to method of eliminating an interruption of a data transmission service occurring during a handover between different communication networks, and a mobile communication terminal for performing the method.

2. Description of Related Art

Developments in wireless communication networks currently create a need for constant development of communication networks. Different communication networks with diverse characteristics, such as a cellular-based mobile communication network starting from an analog method and developing to a digital method, a wireless broadband Internet (WiBro) communication network providing a high-speed data service, a wireless local area network (WLAN), a wireless private area network, and the like are overlapping, and provide users with more diverse communication services.

Also, a mobile communication terminal constantly and functionally develops along with developments of the communication networks, and accordingly may provide diverse services in each similar communication network. Also, a multi-modal mobile communication terminal providing a service in the different communication networks is developing. A multi-modal terminal has a plurality of wireless interfaces, and a connection capability with various wireless communication networks.

A vertical handover (VHO) process from a first communication network to another communication network is required so that the multi-modal mobile communication terminal may smoothly provide service during a transition between the different communication networks. However, since communication network characteristics such as load, transmission environment, system, and the like, vary according to each communication network, a communication disconnection occurring during a handover may cause more complex and serious problems than in a single communication network.

FIGS. 1 through 4 are diagrams illustrating existing handover processes between different wireless communication networks.

Since a multi-mode mobile node (MN) includes at least one interface, the MN implements communication by connecting with a wireless communication network corresponding to a mode for each interface.

Figure 1:
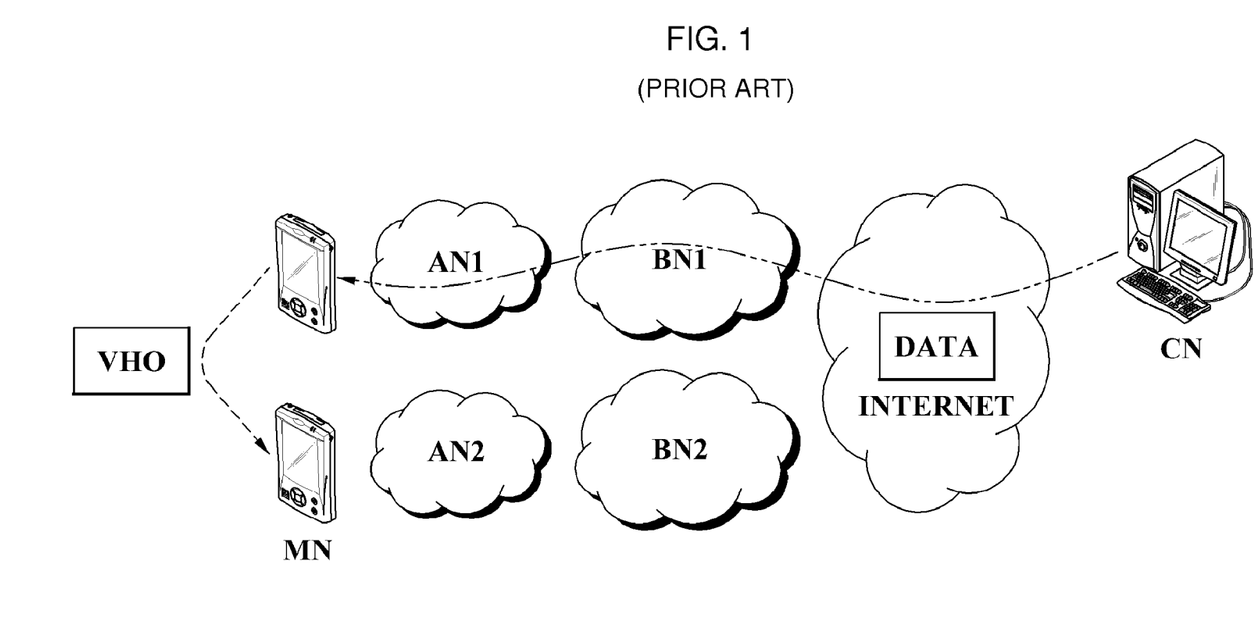
FIGS. 1 through 4 are diagrams illustrating handover processes between different wireless communication networks according to conventional arts.

Referring to FIG. 1, the MN connects with a first wireless access network (AN1), and connects with a corresponding node (CN) via a first backbone network (BN1).

In this instance, a need for a VHO from a present wireless communication network to another wireless communication network may be generated due to diverse reasons. As an example, a handover may occur when the MN is removed from a region being covered by the AN1 to a region being covered by a second access network (AN2) as in a case of changing the MN's location, or when switching to another wireless communication network is required to control power usage of the MN. Another instance is when an appropriate communication network is selected according to the type of user-desired communication service, and a handover to a selected communication network is required.

Figure 2:
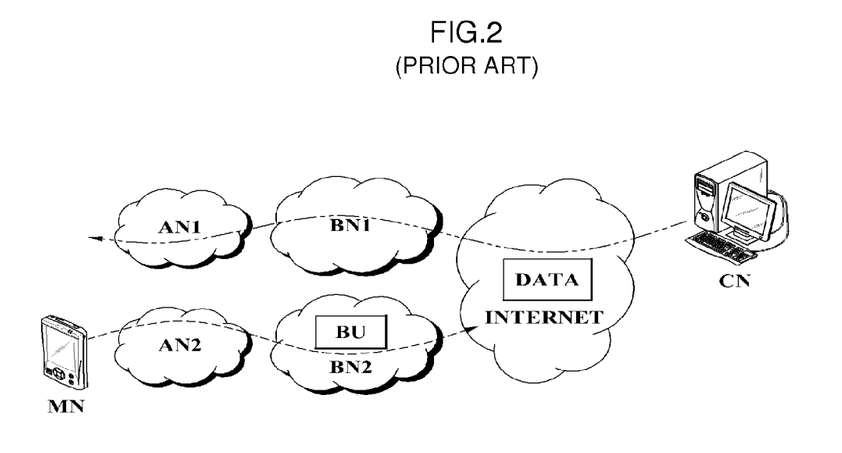

As illustrated in FIG. 2, when a MN determines a handover from the AN1 to the AN2, the MN releases an association with the AN1, and transmits a request message for a handover registration via the AN2. The request message for the handover registration may include MN identification information identifying the MN, MN location information (for example, an Internet Protocol (IP) address), and the like, and is used as a message for the MN to register variations to an individual's location in a network. FIG. 2 illustrates a binding update message (BU) according to a standard of a mobile IP as an example of the request message for the handover registration.

A request message for a handover registration is transmitted (referring to FIG. 3) to a CN via a second backbone network (BN2), and the CN transmits a response message (referring to FIG. 4) to a request for the handover registration, i.e. a BU acknowledgement (BU_ACK) to an MN via an AN2, and thereby informs the MN that the CN normally identifies (or receives) the request for the handover of the MN. FIG. 4 illustrates a BU_ACK according to a mobile IP standard as an example of a response message to the request for the handover registration.

Figure 3:
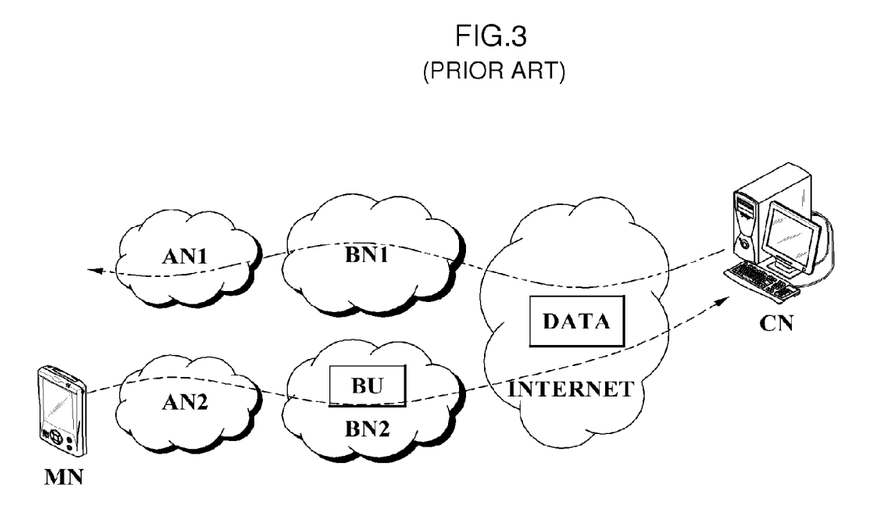
Figure 4:
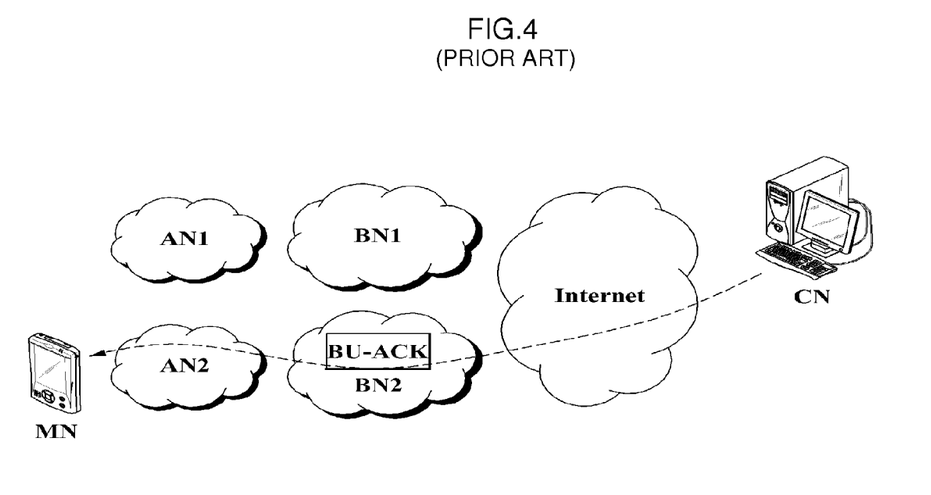

As illustrated in FIGS. 2 and 3, while the MN determines the handover and a request message for the handover registration is transmitted to the CN via the AN2 and the BN2, the CN transmits data through the BN1 and the AN1. Accordingly, this method does not allow the data transmitted via the AN1 to be received at the MN and is lost.

Figure 5:
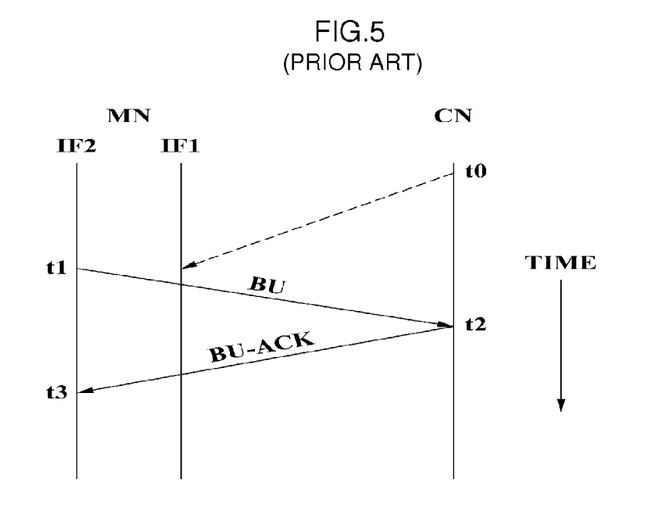
FIG. 5 is a diagram illustrating a flow of transmitting and receiving a message related to a handover between a corresponding node (CN) and a multi-mode mobile node (MN) according to a period of time, according to the conventional arts.

FIG. 5 is a diagram illustrating a flow of transmitting and receiving a message related to a handover between a CN and an MN according to a period of time, according to an existing method.

Referring to FIG. 5, the CN transmits data, while maintaining an association with a first interface (IF1) of the MN in time t0. When the handover is determined, the MN switches an association from an AN1 to an AN2 in time t1. In this instance, a second interface (IF2) transmits a request message for a handover registration (BU) to the CN via the AN2. In time t2, the CN receives the request message for the handover registration (BU) and stops data transmission to the IF1. Also, a response message to a request for the handover registration (BU_ACK) is transmitted to the IF2 via the AN2 in response to receiving the request message for the handover registration. The IF2 of the MN receives the response message to the request for the handover registration (BU_ACK) in time t3.

In FIG. 5, before the CN receives the request message for the handover registration (BU) from the MN, i.e. before time t2, the CN continuously transmits the data to the IF1 via the AN1. Accordingly, from a point in time when the MN determines the handover to a point in time when the CN receives the request message for the handover registration (BU), i.e. for a period of time of t0-t2, the MN may lose the data transmitted from the CN via the AN1.

As a conventional art to restore the data of a period of time of t0-t2, an existing method buffers and then forwards the data (a packet) transmitted from the CN to a node existing in the AN1 (for example, an access point (AP) or a router). Thus, the method is disadvantageous in that an additional function supporting the VHO is required to embody in the communication network.

Accordingly, a need exists for new technology to solve the problems of the conventional art in the process of performing a handover in an environment where different communication networks are distributed, and efficiently provide for seamless data service.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method of providing a handover service to a mobile communication terminal supporting multi-modal communications, and a mobile communication terminal for performing the method to voluntarily prevent data interruption, eliminating assistance from a communication network during a handover.

An aspect of exemplary embodiments of the present invention also provides a method of providing a handover service to a mobile communication terminal supporting multi-modal communications, and a mobile communication terminal for performing the method where a load, due to tunnel maintenance and packet transmission, in a communication network can be reduced, and may allow a mobile communication terminal to smoothly implement a handover.

An aspect of exemplary embodiments of the present invention also provides a method of a handover service for a mobile communication terminal capable of multi-modal communication, and a mobile communication terminal for performing a method allowing a packet to be smoothly received by eliminating the problem of having to reorder packets a terminal receives during the process of a handover.

An aspect of exemplary embodiments of the present invention also provides a method of providing a handover service to a mobile communication terminal that is capable of multi-modal communication, and a mobile communication terminal for performing the method which may allow a seamless service to be efficiently provided, eliminating the need for additional devices by advantageously using the multi-modal function in the terminal.

According to an exemplary embodiment of the present invention, there is provided a method of providing a handover service to a mobile communication terminal capable of multi-modal communication, the method including: transmitting and receiving data to/from a corresponding node via a first access network and a second access network while simultaneously maintaining an association with the first access network and the second access network; determining a point in time of completing a handover registration; and releasing an association with the first access network after the point in time of completing the handover registration.

According to another exemplary embodiment of the present invention, there is also provided a method of providing a handover service to a mobile communication terminal capable of multi-modal communication, the method including: transmitting and receiving data to/from a corresponding node via a first access network and a second access network while simultaneously maintaining an association with the first access network and the second access network; transmitting a request message for the handover registration to the corresponding node via the second access network; receiving, via the first access network, a response message from the corresponding node sent in response to receiving the request message for the handover registration; and releasing an association with the first access network after receiving the response message to the request for the handover registration.

According to still another exemplary embodiment of the present invention, there is provided a method of providing a handover service to a mobile communication terminal capable of multi-modal communication, the method including: transmitting and receiving data to/from a corresponding node via a first access network and a second access network while simultaneously maintaining an association with the first access network and the second access network; transmitting a request message for the handover registration to the corresponding node via the second access network; receiving, via the second access network, a response message to a request for the handover registration from the corresponding node; receiving, via the first access network, a completion message of the handover registration from the corresponding node in response to receiving the request message for the handover registration; and releasing an association with the first access network after receiving the completion message of the handover registration.

According to yet another exemplary embodiment of the present invention, there is provided a method of providing a handover service to a mobile communication terminal capable of multi-modal communication, the method including: transmitting and receiving data to/from a corresponding node via a first access network and a second access network while simultaneously maintaining an association with the first access network and the second access network; calculating a first estimated period of time when a response message to a request for the handover registration is transmitted from the corresponding node to the mobile communication terminal via the first access network; calculating a second estimated period of time when a request message for the handover registration is transmitted from the mobile communication terminal to the corresponding node via the second access network; determining the point in time of completing the handover registration according to the first estimated period of time and the second estimated period of time; and releasing an association with the first access network after the point in time of completing the handover registration.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a method of providing a handover service and a mobile communication terminal for performing the method according to the exemplary embodiments of the present invention will be described with reference to the attached drawings.

The mobile communication terminal according to the exemplary embodiments of the present invention provides a terminal with mobility and, more generally, provides a mobile node. The mobile communication terminal is understood to be a comprehensive definition including a device implementing a communication with a counterpart node (or corresponding node) by connecting with different access networks.

A corresponding node (CN) (or a counterpart node) used in accordance with an exemplary embodiment of the present specification indicates a node implementing a communication service connecting with the mobile communication terminal via a plurality of wireless communication networks, and shall be understood to be a comprehensive definition including all devices with communication interfaces directly connecting with a wired/wireless communication network.

An association used in the present invention is understood to be a status indicating that a terminal (or a node) may transmit and receive data by connecting with the communication network, and shall be understood to comprise meanings such as a connection, a linkage, and the like.

An access network used in the present invention is understood to be a vertical section in the communication network directly connecting with the terminal, may be applied to diverse wireless communication networks such as a mobile communication network, a wireless broadband Internet (WiBro) communication network, a wireless local area network (WLAN), a wireless private area network, and the like, and is not limited to any one of communication networks.

Figure 6:
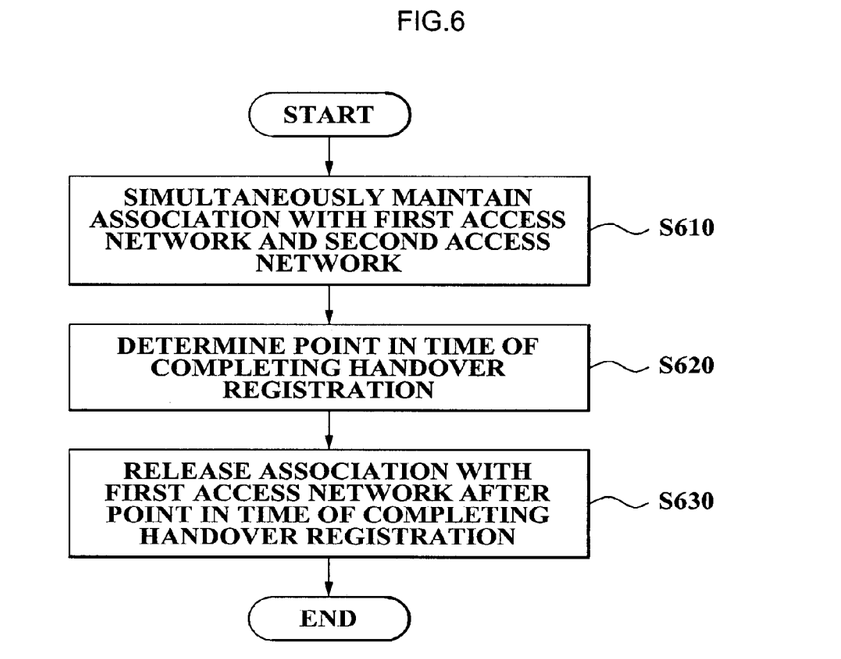
FIG. 6 is a flowchart illustrating a method of providing a handover service according to an exemplary embodiment of the present invention.

FIG. 6 is a flowchart illustrating a method of providing a handover service according to an exemplary embodiment of the present invention. Hereinafter, a function implemented in each operation will be described in detail with reference to FIG. 6.

First, in operation S610, the terminal transmits and receives data to/from a corresponding node via a first access network (AN1) and a second access network (AN2) while simultaneously maintaining an association with the first access network and the second access network.

The mobile communication terminal according to an exemplary embodiment of the present invention is a terminal that supports multi-modal communications, and may transmit and receive data, while simultaneously maintaining the association with at least two wireless access networks. Accordingly, the terminal may continuously maintain the association with an existing access network (AN1) until a point in time when the terminal receives the data via the access network (AN1), while simultaneously maintaining a new association with an access network (AN2).

In operation S620, a point in time of completing the handover registration is determined. According to an exemplary embodiment of the present invention, the terminal is preferably required to continuously maintain the association with the AN1 to continuously receive data transmitted from the CN without loss after transmitting a request message for the handover registration. However, since the association with the AN1 may not be indefinitely maintained for a vertical handover (VHO), the terminal is preferably required to identify a point in time until which the association with the AN1 is maintained, in order to prevent data loss. Accordingly, in operation S620, a point in time until which the association with the AN1 is maintained is determined by deciding a point in time when the handover registration is completed.

Next, in operation S630, after the point in time of completing the handover registration has passed, the association with the AN1 is released.

A few exemplary embodiments of the present invention for determining a point of time of completing the handover registration are described. As an example, there is provided a method by receiving assistance from the CN where the CN informs the terminal of a point in time when the data transmitted to the existing access network is completed. As another example, there is provided a method of estimating a minimum period of time when the terminal is required to voluntarily maintain the association with the AN1 and releasing the association after an estimated period of time.

Figure 7:
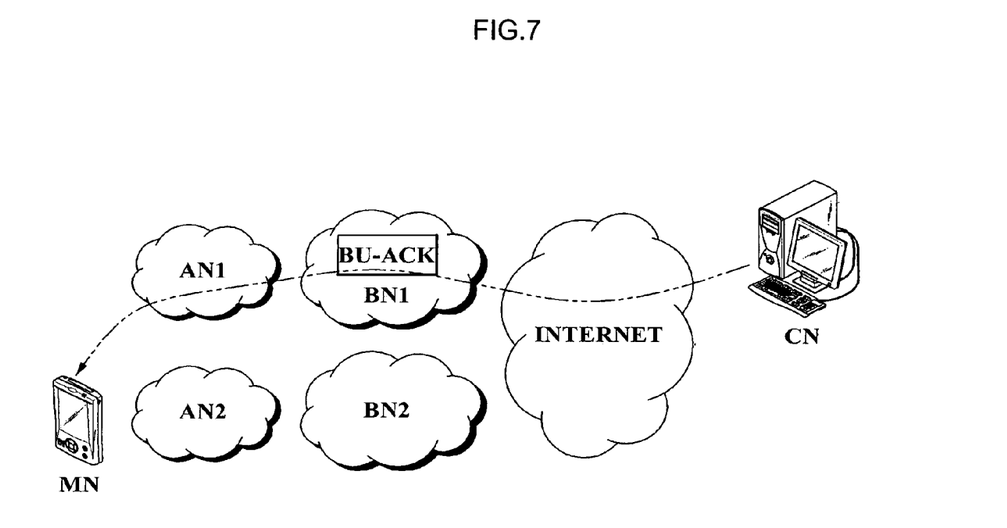
FIG. 7 is a diagram illustrating a process of receiving a message from a CN to determine a point in time of completing a handover registration according to an exemplary embodiment of the present invention.

FIG. 7 is a diagram illustrating a process of receiving a message from a CN to determine a point in time of completing a handover registration according to an exemplary embodiment of the present invention. Hereinafter, a process of receiving a message will be described in detail with reference to a flowchart of FIG. 8.

Figure 8:
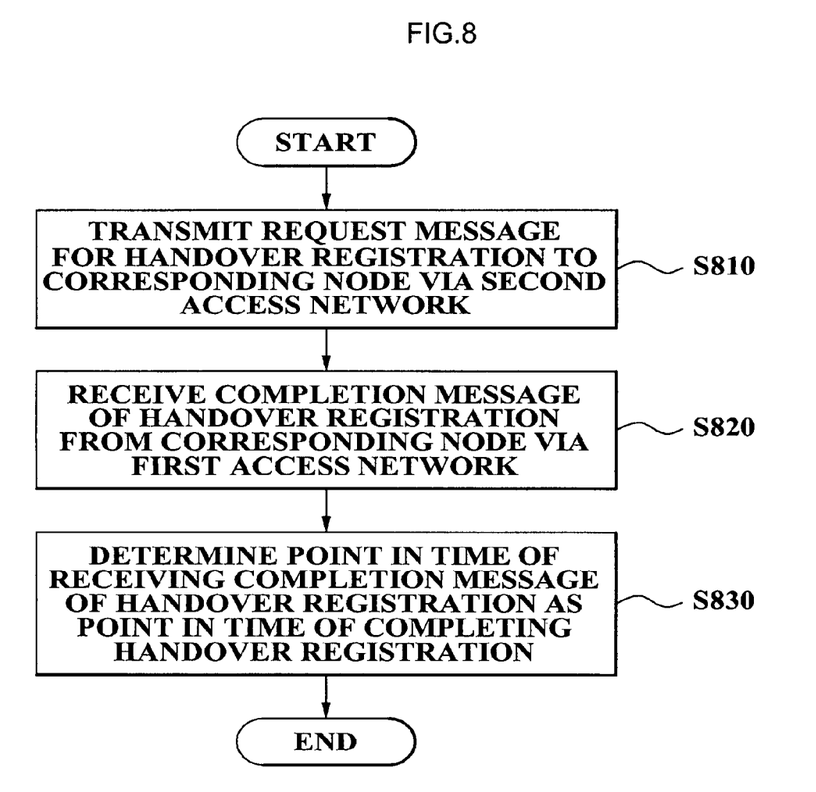
FIG. 8 is a flowchart illustrating a flow to determine a point in time of completing a handover registration according to an exemplary embodiment of the present invention.

In operation S810 of FIG. 8, the terminal transmits a request message for the handover registration to the CN via the AN2.

Next, in operation S820, the CN transmits a completion message of the handover registration, i.e. a binding update acknowledgement (BU_ACK), to the mobile communication terminal via the AN1 in response to receiving the request message for the handover registration, as illustrated in FIG. 7. According to related art in FIG. 4, when the CN receives the request message for the handover registration, the CN transmits the response message to the terminal again, and thereby enables the terminal to confirm that the CN receives the request of the handover registration of the terminal. In this instance, the access network where the response message is transmitted is the same access network, AN2 where the request for the handover registration is received.

However, according to the exemplary embodiment of the present invention, the terminal may interpret the complete message of the handover registration as a new and significant message in relation to the AN1 by using not the AN2 but the AN1 when transmitting the response message to the request for the handover registration. Similar to the description above, since the mobile communication terminal according to an exemplary embodiment of the present invention may simultaneously maintain the association with the AN1 after establishing a new association with the AN2, the response message may be received via the AN1, and accordingly the terminal may interpret the complete message as the new and significant message.

According to related art, the terminal may not know a point in time of completing the data transmitted to the existing access network (AN1). By contrast and according to an exemplary embodiment of the present invention, the terminal may receive the response message from the AN1, and determine a point in time of receiving the response message from the AN1 as a point in time of completing the data transmitted from the AN1. Specifically, a point in time of receiving a completion message of the handover registration is determined as a point in time of completing the handover registration (S830).

In the exemplary embodiment of FIG. 8, the response message transmitted from the CN according to related art is newly defined as the complete message, and is used for determining a point in time of completing the handover registration.

However, according to the exemplary embodiment of FIG. 8, there is a problem with the standards concerning transmission of the response messages being required to change in an existing handover protocol.

Figure 9:
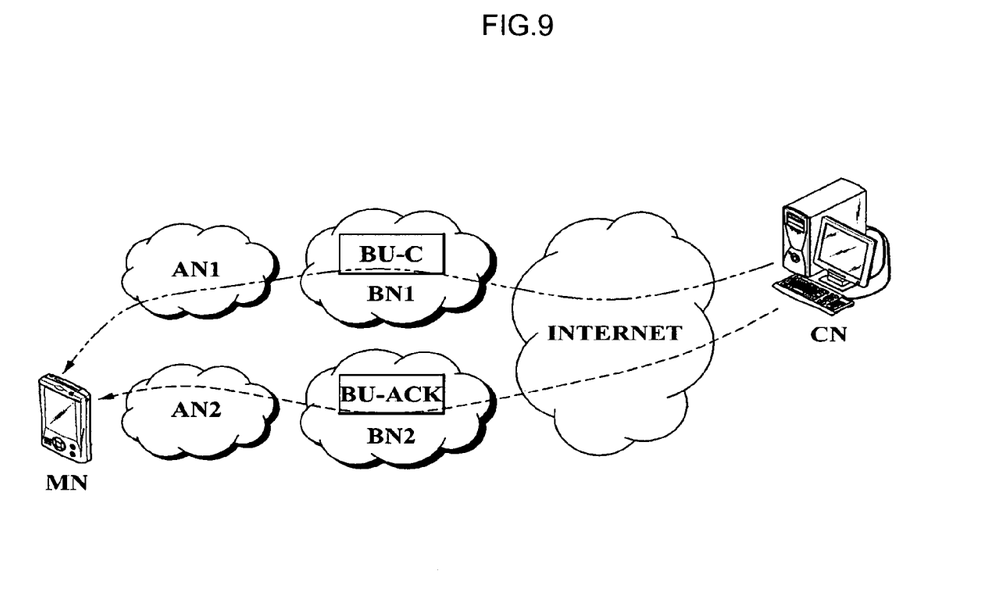
FIG. 9 is a diagram illustrating a process receiving a message from a CN to determine a point in time of completing a handover registration according to another exemplary embodiment of the present invention.

Accordingly, as another exemplary embodiment of the present invention, FIG. 9 defines a new message different from a conventional response message to a request for the handover registration unlike FIG. 8, and uses the new message as the completion message.

According to the other exemplary embodiment of the present invention, the terminal receives the response message (BU_ACK) from the CN via the AN2 similar to related art. However, the CN additionally transmits a completion message of the handover registration (BU_C) from the CN to the terminal via the AN1 in response to receiving the request message for the handover registration transmitted from the terminal. The terminal releases the association with the AN1 after receiving the BU_C.

Figure 10:
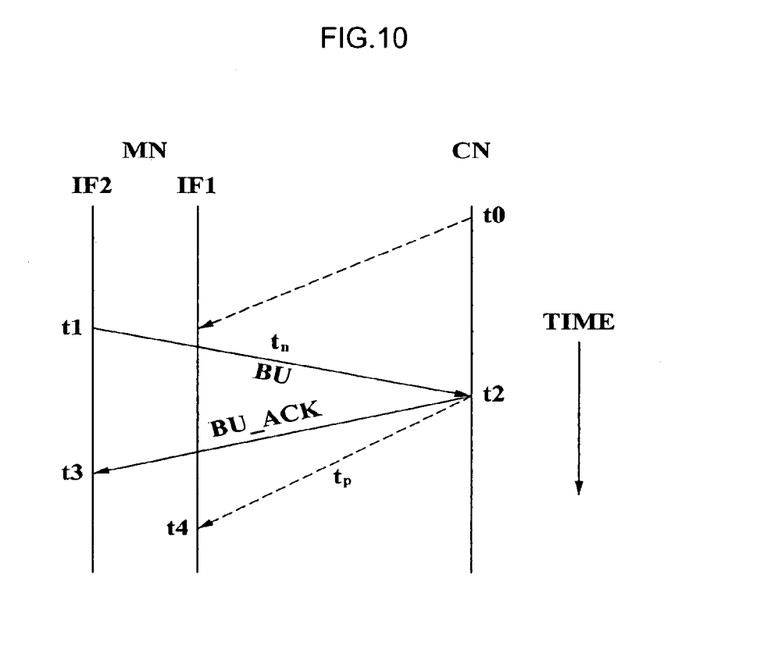
FIG. 10 is a diagram illustrating a method of estimating a period of time when it is required that a terminal voluntarily maintains an association with a first access network (AN1) to determine a point in time of completing a handover registration according to another exemplary embodiment of the present invention.

FIG. 10 is a diagram illustrating a method of estimating a period of time when it is required that a terminal voluntarily maintains an association with a first access network (AN1) to determine a point in time of completing a handover registration according to another exemplary embodiment of the present invention. FIG. 10 generally follows a message transmission (t1, t2 and t3) of FIG. 5, but t4 indicates a point in time when a BU_C is received from the CN to the IF1 of the terminal.

According to the exemplary embodiment of the present invention, since the terminal may not know a point in time of completing the data transmitted for the existing access network (AN1), time t4 is estimated and used.

Specifically, as illustrated in FIG. 10, when the terminal releases (disconnects) the association with the IF1 and the AN1 in time t1 when the terminal determines the handover, the data transmitted from the CN to the IF1 between time t1 and time t4 is lost. Accordingly, to prevent data loss, the association with the IF1 and the AN1 is required to be maintained for a longer period of time than the estimated period of time, estimating a period of time between time t1 and time t4.

An equation may be drawn from the flowchart of FIG. 10, as follows.

$$t4-t1=tn+tp$$ [Equation 1]

Figure 11:
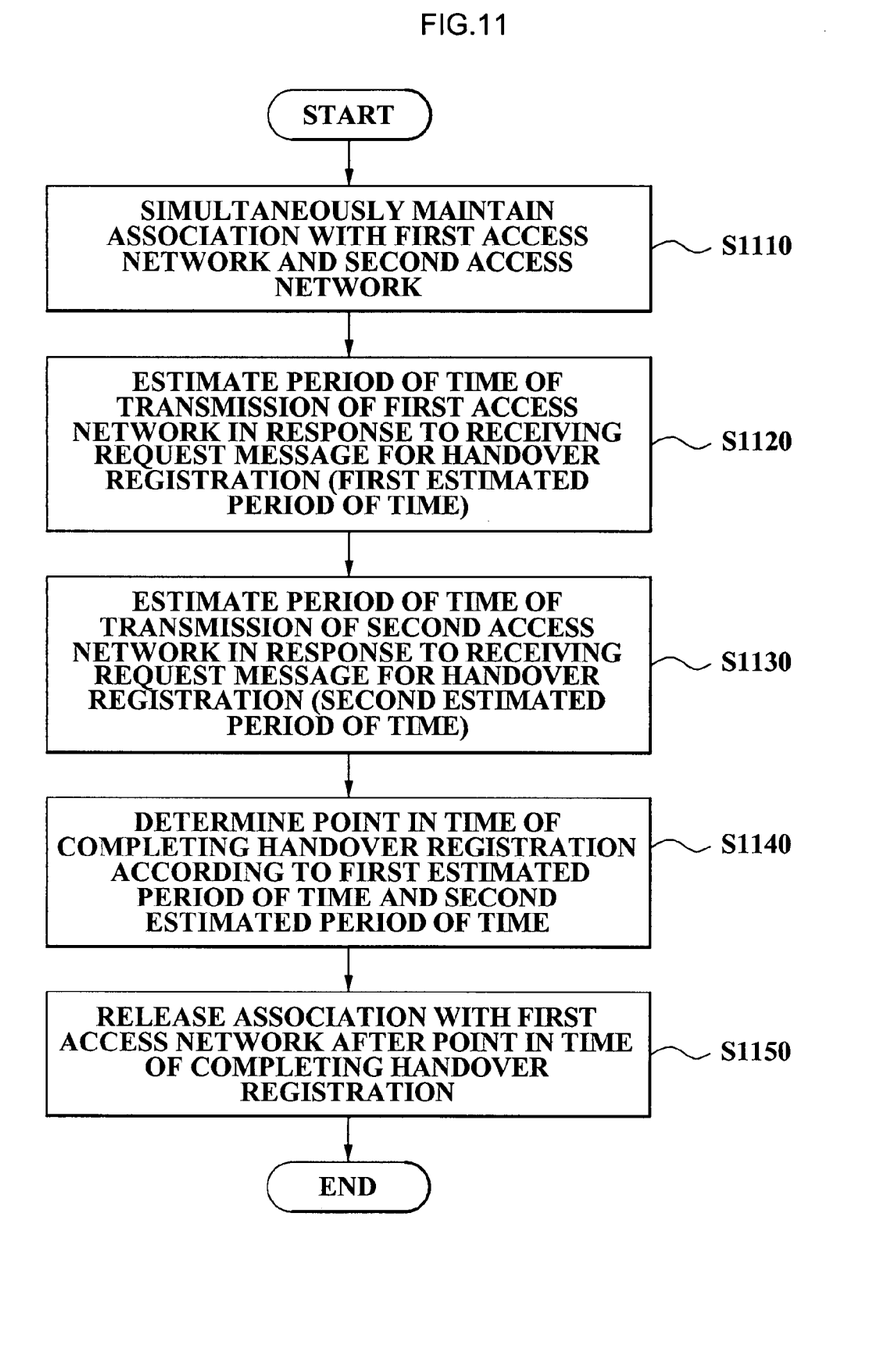
FIG. 11 is a flowchart illustrating a method of providing a handover service according to another exemplary embodiment of the present invention.

By using Equation 1, a method of providing a handover service according to still another exemplary embodiment of the present invention will be described with reference to a flowchart of FIG. 11.

In operation S1110, data is transmitted and received to/from a CN via an AN1 and an AN2 while simultaneously maintaining an association with the AN1 and the AN2.

Next, in operation S1120, a first estimated period of time when a response message to a request for the handover registration is transmitted from the CN to the mobile communication terminal via the AN1 is calculated. The terminal may calculate an amount of time for a round-trip transmission of the packet until the terminal transmits a request packet for the handover registration via the AN1, and receives a response packet to a request for the handover registration from the CN via the AN1 while simultaneously maintaining the association with the AN1 via the IF1, and use half of a calculated value as a first estimated period of time (tp).

Next, in operation S1130, a second estimated period of time when a request message for the handover registration is transmitted from the mobile communication terminal to the CN via the AN2 is calculated. The terminal may calculate a period of a round-trip transmission time of the packet until the terminal transmits a request packet for the handover registration via the AN2, and receives a response packet to a request for the handover registration from the CN via the AN2 while simultaneously maintaining the association with the AN2 via the IF2), and use half of a calculated value as a second estimated period of time (tn).

In operation S1140, the point in time of completing the handover registration according to the first estimated period of time and the second estimated period of time is determined. In operation S1150, the association with the AN1 is released after the point in time of completing the handover registration.

Calculation values of the first estimated period of time and the second estimated period of time may be modified according to characteristics of wireless communication networks and loads of communication networks.

An operation of determining the point in time of completing the handover registration (S1140) may determine the point in time of completing the handover registration, wherein the point in time of completing the handover registration (t4) is the addition of the first estimated period of time and the second estimated period of time. The point in time (t1) of transmitting the request message to the CN via the AN1 is established as a starting point in time.

As still another exemplary embodiment of the present invention, when determining the point in time of completing the handover registration, the first estimated period of time and the second estimated period of time may be added including a small margin. Specifically, by establishing the margin along with the addition, the terminal may sufficiently maintain the association with the AN1, and receive the data transmitted from a first CN (CN1) via the AN1 without loss.

According to the exemplary embodiments of the present invention described with reference to FIG. 10 and FIG. 11, since an estimated value calculated in the terminal is used, there is an advantage that an additional mechanism is not required for the CN and the communication network, and embodiments may be simply realized.

A method of providing a handover service of a mobile communication terminal according to the above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include, but are not limited to, magnetic media such as hard disks, floppy disks, and magnetic tape; optical media such as CD ROM disks and DVD; magneto-optical media such as optical disks; hardware devices that are specially configured to store and perform program instructions, such as read-only memory (ROM), random access memory (RAM), flash memory; and carrier waves (such as data transmission through the Internet via wired or wireless transmission paths), and the like. The computer-readable recording media can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 12:
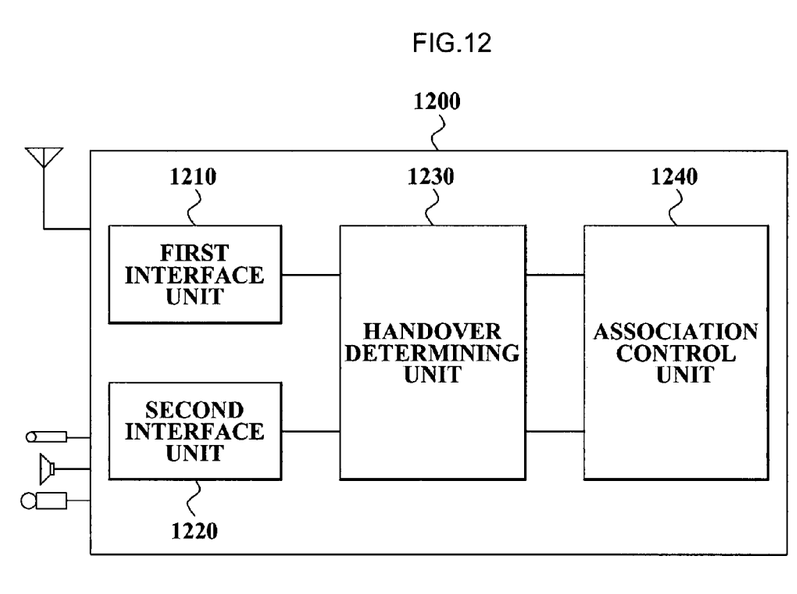
FIG. 12 is a block diagram illustrating a mobile communication terminal supporting multi-modal communications according to an exemplary embodiment of the present invention.

FIG. 12 is a block diagram illustrating a mobile communication terminal 1200 supporting multi-modal communications according to an exemplary embodiment of the present invention. Hereinafter, a function will be described in detail for each configuring element with reference to FIG. 12.

The mobile communication terminal according to an exemplary embodiment of the present invention may include at least one interface to connect with a plurality of different communication networks, and transmit and receive data according to each communication mode connecting with a corresponding communication network for each interface.

A first interface unit 1210 in FIG. 12 communicates with a CN on a first communication mode while maintaining an association with an AN1), and a second interface unit 1220 communicates with a CN on a second communication mode while maintaining an association with an AN2.

A handover determining unit 1230 determines a point in time of completing a handover registration from the AN1 to the AN2, and an association control unit 1240 controls the first interface unit to release the association with the AN1 after the point in time of completing the handover registration.

As an example for determining a point in time of completing a handover registration, when the second interface unit 1220 transmits a request message for the handover registration to the CN via the AN2, and the first interface unit 1210 receives a completion message of the handover registration from the CN via the AN1, the handover determining unit 1230 may determine a point in time of receiving the completion message of the handover registration as the point in time of completing the handover registration.

As still another example according to the present invention, when the second interface unit 1220 transmits a request message for the handover registration to the CN via the AN2, and receives a response message to a request for the handover registration from the CN via the AN2, the first interface unit 1210 receives a completion message of the handover registration from the CN via the AN1. The handover determining unit 1230 may determine a point in time of receiving the completion message of the handover registration as the point in time of completing the handover registration.

As another example according to the present invention, The handover determining unit 1230 calculates a first estimated period of time when a response message to a request for the handover registration is transmitted from the CN to the mobile communication terminal via the AN1, calculates a second estimated period of time when a request message for the handover registration is transmitted from the mobile communication terminal to the CN via the AN2, and may determine the point in time of completing the handover registration according to the first estimated period of time and the second estimated period of time. Specifically, the handover determining unit 1230 may determine a point in time as the point in time of completing the handover registration, wherein the point in time of completing the handover is after an addition of the first estimated period of time and the second estimated period of time, and a point in time of transmitting the request message to the CN via the AN1 is established as a starting point in time.

Since the exemplary embodiment of a configuration of the mobile communication terminal supporting multi-modal communications according to the present invention is described, and technical contents described in a method of providing a handover service in FIGS. 6 through 11 may be applied to the exemplary embodiment of the present invention, thus, a more specific description is omitted.

According to the exemplary embodiments of the present invention, it is possible to provide a seamless service eliminating data interruption during a handover between different communication networks.

According to the exemplary embodiments of the present invention, it is possible that a load, due to tunnel maintenance and a packet transmission, in a communication network can be reduced, and can enable a mobile communication terminal to smoothly implement a handover.

According to the exemplary embodiments of the present invention, there is an advantage that an additional mechanism is not required for the CN and the communication network, and embodiments may be simply made in a technical method when providing a handover by using estimation.

According to the exemplary embodiments of the present invention, it is possible to solve a reordering problem of received packets, since a packet buffering process is not required for restoring lost packets lost according to conventional art.

According to the exemplary embodiments of the present invention, it is possible that a seamless service can be efficiently provided eliminating a need for an additional device by using an advantage of a multi-modal function in the terminal.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile communication terminal supporting multi-modal communications comprising:
   a first interface unit for communicating with a corresponding node on a first communication mode while maintaining an association with a first access network;
   a second interface unit for communicating with the corresponding node and a second communication mode while maintaining an association with a second access network;
   a handover determining unit for determining a point in time of completing a handover registration from the first access network to the second access network, the handover registration based at least on communication between the corresponding node and the mobile node; and
   an association control unit for controlling the first interface unit to release the association with the first access network after the point in time of completing the handover registration;
   wherein the first interface unit or the second interface unit receives a completion message of the handover registration from the corresponding node, and the handover determining unit determines a point in time of receiving the completion message of the handover registration as the same point in time of the completing the handover registration.

2. The mobile communication terminal of claim 1, wherein the second interface unit transmits a request message for the handover registration to the corresponding node via the second access network,
   the first interface unit receives a completion message of the handover registration from the corresponding node via the first access network, in response to the request message for the handover registration.

3. The mobile communication terminal of claim 1, wherein the second interface unit receives a response message to a request for the handover registration from the corresponding node via the second access network.

4. The mobile communication terminal of claim 1, wherein the handover determining unit calculates a first estimated period of time when a response message to a request for the handover registration is transmitted from the corresponding node to the mobile communication terminal via the first access network,
   calculates a second estimated period of time when a request message for the handover registration is transmitted from the mobile communication terminal to the corresponding node via the second access network, and
   determines the point in time of completing the handover registration according to the first estimated period of time and the second estimated period of time.

5. The mobile communication terminal of claim 4, wherein the handover determining unit determines the point in time of completing the handover registration as the sum of the first estimated period of time and the second estimated period of time, and a point in time of transmitting the request message to the corresponding node via the first access network is established as a starting point in time.

* * * * *

UNITED STATES PATENT AND TRADEMARK OFFICE
CERTIFICATE OF CORRECTION

PATENT NO.        : 8,116,279 B2                                              Page 1 of 1
APPLICATION NO.   : 11/797269
DATED             : February 14, 2012
INVENTOR(S)       : Chee Ha Kim et al.

It is certified that error appears in the above-identified patent and that said Letters Patent is hereby corrected as shown below:

On the title page:

Item (75) Inventors, Replace "Boung Jun Lee" with "Byoung Joon Lee"

Signed and Sealed this
Twelfth Day of June, 2012

David J. Kappos
*Director of the United States Patent and Trademark Office*